United States Patent [19]

Shimakawa et al.

[11] Patent Number: 5,663,008
[45] Date of Patent: Sep. 2, 1997

[54] MODULE BATTERY OF SEALED ALKALINE STORAGE BATTERY

[75] Inventors: Shinichi Shimakawa, Moriguchi; Shinji Hamada, Hirakata; Hiromu Matsuda, Kawabe-gun; Manabu Kakino, Uji; Munehisa Ikoma, Shiki-gun, all of Japan

[73] Assignee: Matsushita Electric Industrial Co., Ltd., Osaka-Fu, Japan

[21] Appl. No.: 614,436

[22] Filed: Mar. 12, 1996

[30] Foreign Application Priority Data

Mar. 14, 1995 [JP] Japan .................. 7-054801

[51] Int. Cl.⁶ .................. H01M 2/10
[52] U.S. Cl. .................. 429/53; 429/99; 429/159
[58] Field of Search .................. 429/159, 156, 429/148, 96, 99, 100, 53, 54, 163, 157, 206

[56] References Cited

U.S. PATENT DOCUMENTS

| | | | |
|---|---|---|---|
| 1,622,767 | 3/1927 | Cole | 429/159 |
| 3,623,917 | 11/1971 | Chassoux | 429/148 X |
| 3,846,179 | 11/1974 | Shaw | |
| 4,020,244 | 4/1977 | Selinko | 429/100 |
| 4,347,294 | 8/1982 | Mejia | 429/159 X |
| 4,401,730 | 8/1983 | Szymborski et al. | 429/53 |
| 4,977,043 | 12/1990 | Kadouchi et al. | 429/54 |
| 5,492,779 | 2/1996 | Ronning | 429/148 X |

FOREIGN PATENT DOCUMENTS

| | | |
|---|---|---|
| 0 065 349 | 11/1982 | European Pat. Off. . |
| 0 669 663 | 8/1995 | European Pat. Off. . |
| 1267153 | 11/1961 | France . |
| 1 537 108 | 12/1978 | United Kingdom . |

*Primary Examiner*—Anthony Skapars
*Attorney, Agent, or Firm*—Panitch Schwarze Jacobs & Nadel, P.C.

[57] ABSTRACT

In the module battery, by disposing end plates including a flat plate portion and a rectangular frame portion at each end of a cell group and by binding the cell group by means of binding members and metal studs, the increase of the internal pressure during the charging/discharging cycles and the dimensional change of the module battery due to the expansion of the cell group can be suppressed, while the weight and volume increase caused by the binding members is minimized.

10 Claims, 8 Drawing Sheets

MODULE BATTERY OF SEALED ALKALINE STORAGE BATTERY

BACKGROUND OF THE INVENTION

1. Field of the Invention

The present invention relates to a module battery of a sealed alkaline storage battery having a comparatively large capacity.

2. Description of the Prior Art

Sealed alkaline storage batteries, which typically include nickel-cadmium storage batteries and nickel-metal hydride storage batteries, are widely used as power supply sources for portable equipments such as video cassette recorders, lap-top type computers and portable telephones owing to their high energy density and reliability. These batteries have metal casings of cylindrical or rectangular shape, a capacity of about 0.5 Ah to 3 Ah, and are configured of cells to make up a small-sized sealed alkaline storage battery. In practical applications, several to several tens of cells are generally contained in a synthetic resin casing or tube.

These small-sized sealed alkaline storage batteries have a battery capacity as small as about 0.5 Ah to 3 Ah, and therefore generate only a small amount of heat per cell at the time of charging or discharging. As a result, in the case where they are used in a resin casing or tube, an appropriate balance or equilibrium is maintained between heat generation and heat discharge. Therefore no significant problem has been posed with regard to a temperature increase of the battery. Also, although the electrodes of the alkaline storage battery expand as a result of repetitive charging and discharging, no serious problem such as casing deformation due to electrode expansion has been posed in view of the fact that the casing is made of a metal having a durability.

Nevertheless, there is an ever-increasing demand for medium and large-sized batteries (the medium-sized battery is defined as those from 10 Ah to 100 Ah in capacity, and the large-sized one as those 100 Ah or more in capacity. The number of cells used is several to several hundreds for either type) which is high in energy density and in reliability as a mobile power supply for various devices including home-use appliances and electric vehicles. The open-type nickel-cadmium storage battery and the lead-acid storage battery are used for energy storage and as an uninterruptive power supply. In spite of these advantages, these batteries have the disadvantage of the need of troublesome maintenance such as for filling an electrolyte solution during the lifetime. In view of this, there has been a demand for a battery suitable for a mobile power source for various applications including home-use appliances and electric vehicles, which is free from maintenance, by having a sealed configuration.

As explained above, in the case where an alkaline storage battery is used as a mobile power supply for various devices including home-use appliances and electric vehicles, the battery is required to be sealed and increased in size to medium or large scale at the same time. More specifically, it is necessary to increase the electric capacity of the cell and to connect a multiplicity of the cells in series in order to increase the electric capacity and voltage of a unit, while sealing them.

A battery generates Joule's heat and reaction heat due to electrode reaction at charging and discharging operations. A module battery including a series of cells having such a large capacity or a pack battery including a series of the module batteries is configured of several tens to several hundreds of the cells arranged contiguously to each other. The cells, with an increased electric capacity and sealed configuration, increase in the amount of heat accumulation, with the result that heat dissipation out of the battery is retarded and the generated heat is accumulated within the battery. Consequently, the internal temperature of such a battery rises by a degree more than that of a smaller battery.

In order to obviate the above-mentioned problems, a heat dissipation device for the storage battery system has been suggested by Japanese Laid-Open Patent Publication No. Hei 3-291867 configured of a multiplicity of cells generating heat at the time of charging, in which each cell includes positive electrodes, negative electrodes and an electrolyte, and in which a space for allowing air flow is formed between the cells with a ratio of space width to cell width set to a range of 0.1 to 1.0.

However, the conventional sealed alkaline storage battery for a mobile has the following problems:

(1) In a lead acid storage battery, the internal pressure is increased through a charging operation by approximately 0.05 MPa even when the battery is of a sealed type, while the increase of the internal pressure caused in a charging operation of a sealed alkaline storage battery is 0.2 to 0.4 MPa. When the battery is used as a mobile power supply in the high temperature environment in the open air for a long period, in particular when it is used or left in a charged state, the battery casing is exposed to continuous application of the internal pressure of approximately 0.2 to 0.4 MPa, and a battery casing with low rigidity and small strength has a possibility of damage due to creep deformation. Furthermore, in the case where 1,000 or more cycles of the charging and discharging operations are conducted in the high temperature environment in the open air, the battery casing has a possibility of being damaped owing to dynamic fatigue caused by variation in the internal pressure, and therefore, in view of long term reliability and safety, a module battery structure is desired in which a battery casing is prevented from being damaged due to the deformation.

(2) In the case where a battery casing is expanded and deformed due to the increase of the internal pressure, there occurs a space between a power generation element group and the battery casing. When the space exists between the power generation element group and the battery casting, the transferring rate of heat generated in the power generation element group to the battery casing is extremely decreased. Therefore, a module battery structure is desired in which a power generation element group is always made to be in contact with a battery casing by suppressing the deformation of the battery casing.

(3) For the application to a mobile power supply, a module battery including accumulation of approximately 5 to 40 cells, or two or more module batteries, that is, accumulation of approximately 10 to 300 cells, is used, and hence, it is necessary to provide means for decreasing the variation in the battery performances such as battery capacity among these several to several hundreds cells, improving the battery performances such as energy density and improving the mechanical strength in order to suppress displacement due to vibrations and to make constant the dimensional change caused during the charging/discharging cycles. Furthermore, since a plate and a binding member for binding the cells are used in the open air for a long period, it is necessary to prevent degradation due to corrosion.

SUMMARY OF THE INVENTION

An object of the present invention is to provide an excellent module battery in which deformation of a battery casing of a cell is prevented, volume energy density and weight energy density are improved in the module battery or the combined cells, heat generated in the battery during a charging/discharging operation can be efficiently dissipated out of the battery system, and the battery performances are not fluctuated.

The other object of the present invention is to prevent deformation or damage of a module battery due to fatigue of a battery casing even through long time usage in the high temperature environment in the open air or repeated charging/discharging operations, to minimize the dimensional change caused during the charging/discharging cycles even through the application to a mobile power supply, to improve mechanical strength against vibrations and corrosion resistance in the module battery or combined cells and to improve long term reliability.

The present invention provides a module battery of a sealed alkaline storage battery comprising:

- a cell group including plural cells stacked in the same direction as the lamination direction of electrodes thereof, whose power generation elements are contained in a rectangular battery casing of a synthetic resin sealed with a lid having a safety valve,
- end plates disposed at both end surfaces in the stacking direction of the cell group, and
- band-like binding members for coupling the end plates and binding the cell group in the stacking direction,
- wherein the end plate includes a rectangular flat plate portion and a rectangular frame portion rising from four sides of the flat plate portion in a continuous manner, and the binding members are connected to the end plate at the rectangular frame portion.

The end plate includes a rectangular flat plate and a rectangular frame rising from four sides of the flat plate in a continuous manner, and the binding members are connected to the frame of the end plate. Therefore, the mechanical strength is improved, and by suppressing the expansion of the battery casing caused by the increase of the internal pressure during a charging operation and the expansion of electrodes, heat can be efficiently dissipated through the battery case of the electrode group.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE PREFERRED EMBODIMENT

Figure 1:
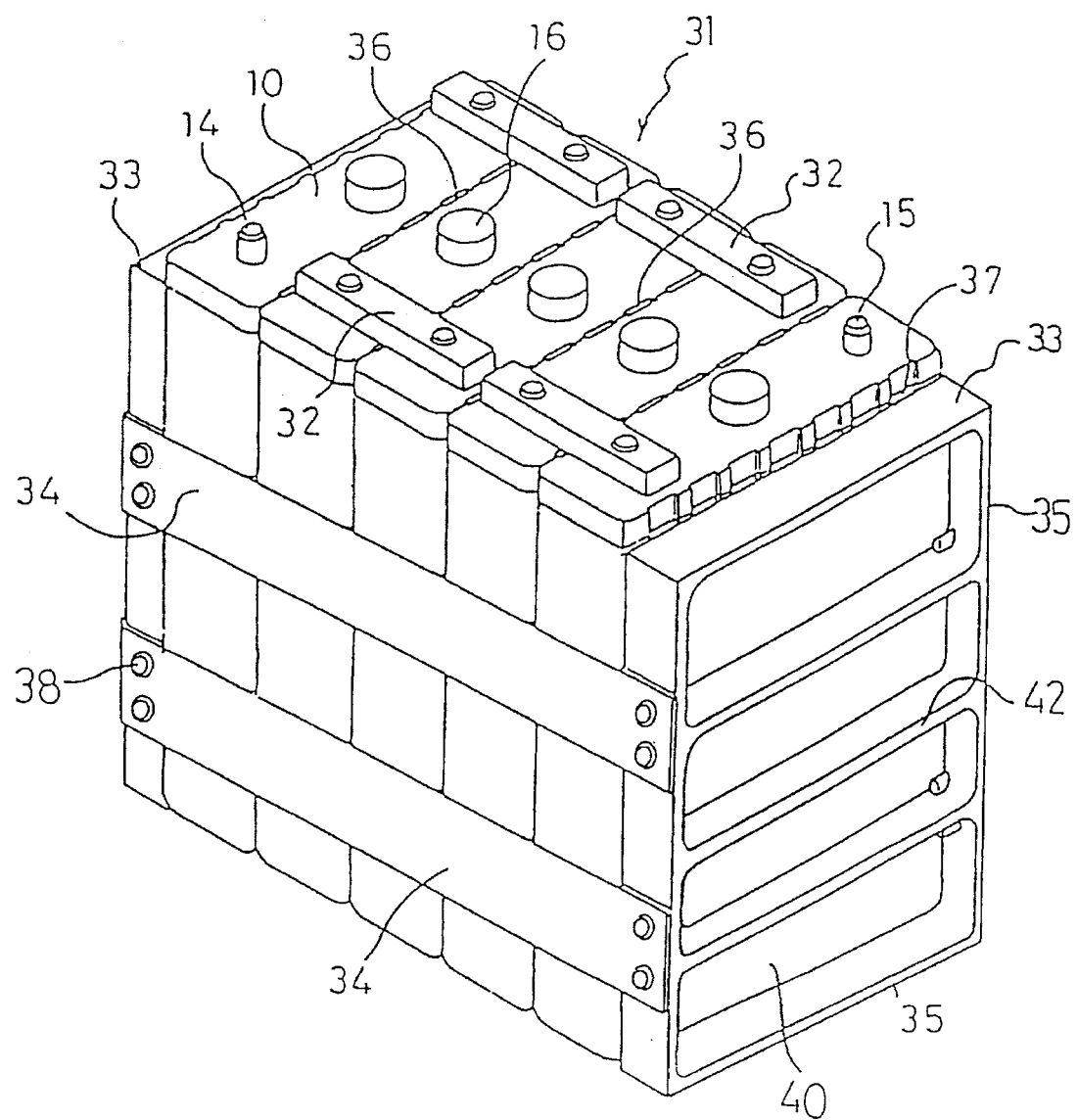
FIG. 1 shows a perspective view of a module battery of a sealed alkaline storage battery of the First Embodiment in the present invention.

Now, a module battery of a sealed alkaline storage battery in the present invention, and a cell and a binding member included therein will be described referring to the drawings.

Figure 2:
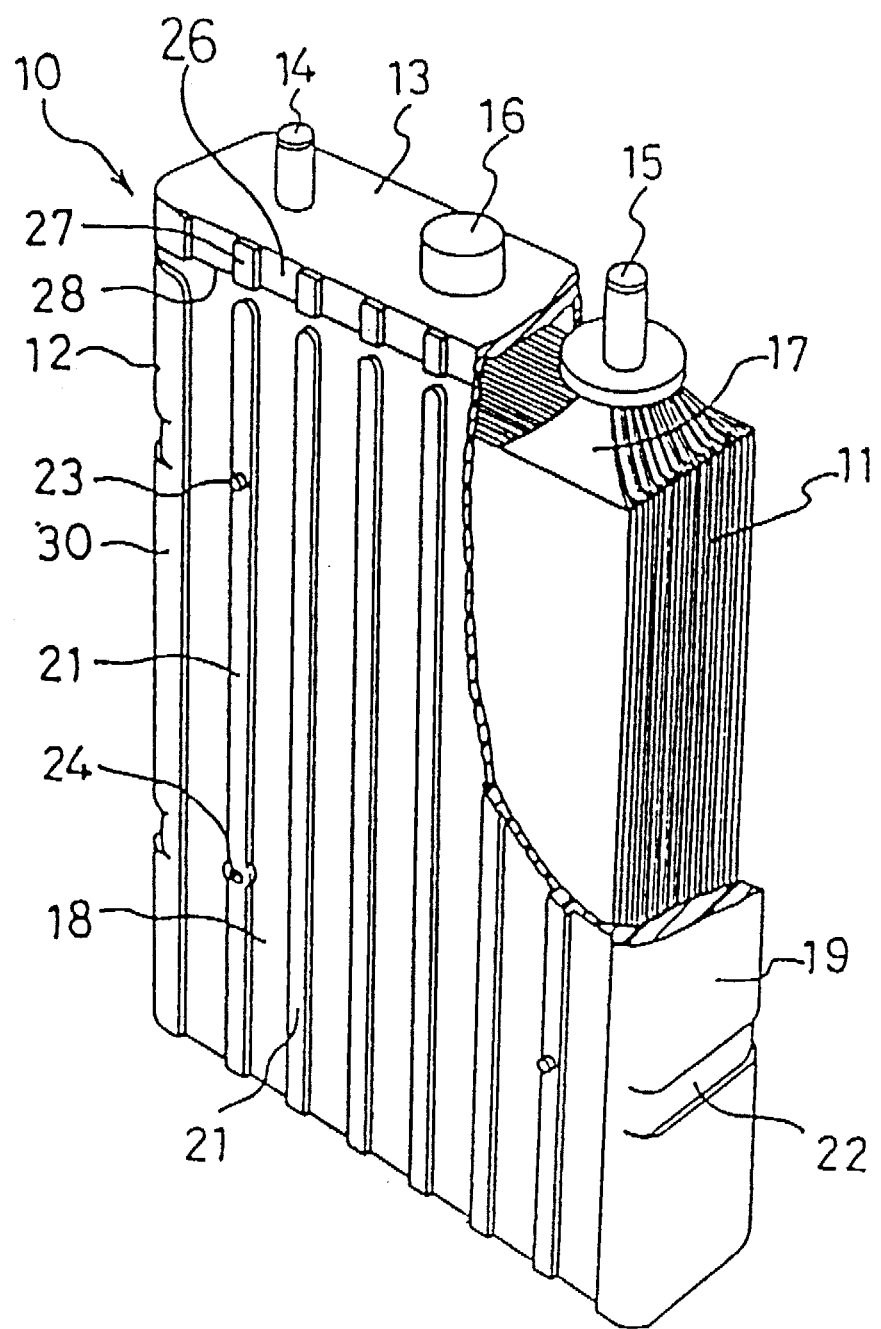
FIG. 2 shows a partially-cutaway perspective view of a cell of the First Embodiment in the present invention.

A cell 10 shown in FIG. 2 is composed of an electrode group 11, a battery casing 12 of a synthetic resin containing an electrolyte, and a lid 13 of the same synthetic resin which was thermally welded to the upper opening of the casing 12. The electrode group 11 includes a lamination of positive electrodes, negative electrodes and separators. On the lid 13 are fixed a positive terminal 14 and a negative terminal 15 of nickel-plated iron and a safety valve 16 with a working pressure of 0.5 MPa. A negative terminal 15 is connected to a lead member 17 of the negative electrode at a downward extending portion at its lower end (not shown), and the upper portion thereof is fixed on the lid 13 in liquid and air tight fashion. Also a positive terminal 14 is connected to a lead member of the positive electrode at the lower end thereof (not shown). The casing 12 includes wider side walls 18 located in the lamination direction of the electrodes, narrower side walls 19 and a bottom wall (not shown). On the outer surface of the wider side wall 18 are provided a plurality of ribs 21 longitudinally in parallel with a predetermined interval therebetween for placing the cells 10 in butted relation with one another. On the upper and lower portions of the outer surfaces of the narrower side walls 19 are provided two pairs of recesses 22 for positioning and fitting binding members 34. Among the ribs 21, the end ribs are provided with protrusions 23 and recesses 24 in reversed positions used for the butted positioning.

The lid 13 has ribs 27 similar to the ribs 21 of the casing 12 on the outer surfaces of its wider side walls 26.

The weld portion between the lid 13 and the casing 12 is denoted by a reference numeral 28, and an externally projecting portion of the margin for the welding was removed by grinding.

FIG. 1 shows a module battery 31 in which five cells 10 are stacked in the same direction as the lamination directions of the electrodes and electrically connected in the same direction as the lamination direction of the electrodes and electrically connected in series. The adjacent cells 10 are relatively positioned to each other by butting the mutual ribs 21 of the battery casing 12 and fitting the protrusion 23 disposed on the rib 21 of one cell 10 in the recess 24 disposed on the rib 21 of the other cell 10. Furthermore, the positive electrode terminals 14 and the negative electrode terminals 15 of the adjacent cells 10 are connected by means of connecting conductors The five cells 10 which are thus electrically connected in series are provided with an aluminum end plate 33 in contact with both ends of the stacked cells 10, and the end plates 33 are coupled and fixed by using four stainless steel band-like binding members 34 and metal studs 38, so as to tightly bind the cells 10 thereby preventing the cells 10 from being separated from one another owing to the expansion of the electrode groups 11 and the increase of the internal pressure.

In the module battery 31 having the above-described configuration, spaces 36 are formed between the ribs 21. Also between the both end cells 10 and the end plate 33 are formed spaces 37 corresponding to the height of the rib 21. Furthermore, the binding members 34 are positioned with parts thereof fitted in the two pairs of the recesses 22 disposed at the upper and lower portions of the outer surfaces of the narrower side walls 19.

Figure 3:
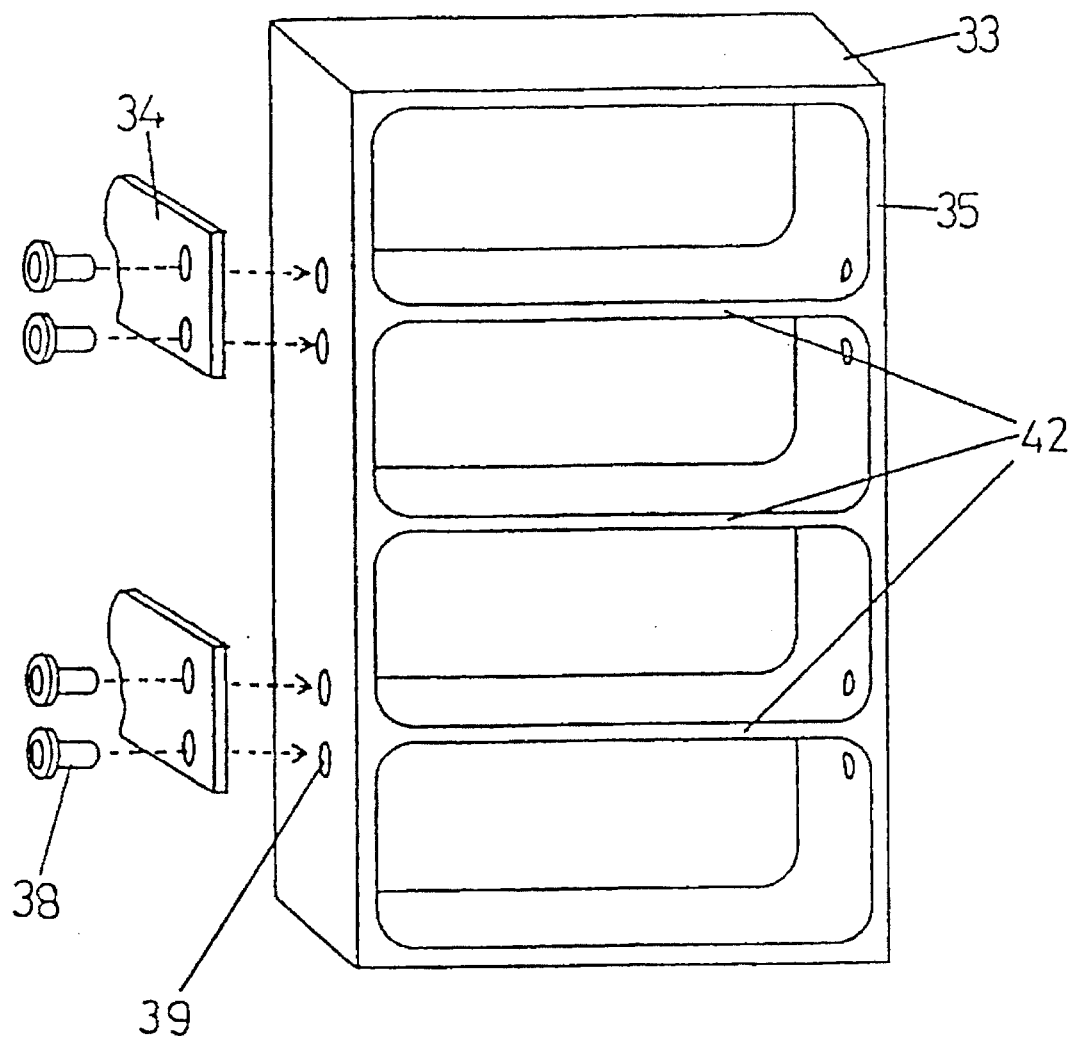
FIG. 3 shows a perspective view showing part of an end plate, studs and binding members in the battery of the First Embodiment in the present invention.

FIG. 3 is a detailed diagram of the end plate 33, the binding members 34 and the studs 38 shown in FIG. 1. The end plate 33 includes a rectangular flat plate portion 40 and a rectangular frame portion 35 rising from the four sides of the flat plate portion 40 in a continuous manner, and further includes horizontally extending ribs 42. Holes 39 for the studs 38 for fixing the end portions of the binding member 34 are formed at such positions as to sandwich a connecting portion on the side surface of the frame portion 35 to the rib 42. The dimensions of the end plate 33 and the binding member 34 are determined depending upon the expansion force of the electrode group, the internal pressure and the number of the stacked cells. In the following embodiments, the thickness of the rectangular flat plate portion 40 was 3 mm, the protrusion height of the rectangular frame portion 35 was 11 mm, and the binding member 34 had a width of 30 mm and a thickness of 1 mm.

Furthermore, although not shown, the end plate 33 and the binding member 34 are coated with a resin film with alkali resistance and electric insulating property.

The cell 10 having the configuration shown in FIG. 2 was subjected to an initial charging/discharging operation by charging it for 15 hours at a current of 10 A and discharging it at a current of 20 A till the voltage had been lowered to 1.0 V. Through this charging/discharging operation, the electrode group 11 was expanded, so as to be in contact tightly with the wider side walls 18 of the battery casing 12. This cell 10 has a capacity restricted by the positive electrode and has a battery capacity of 100 Ah.

By using five cells as described above, a module battery as shown in FIG. 1 was manufactured.

[The First Embodiment]

Figure 4:
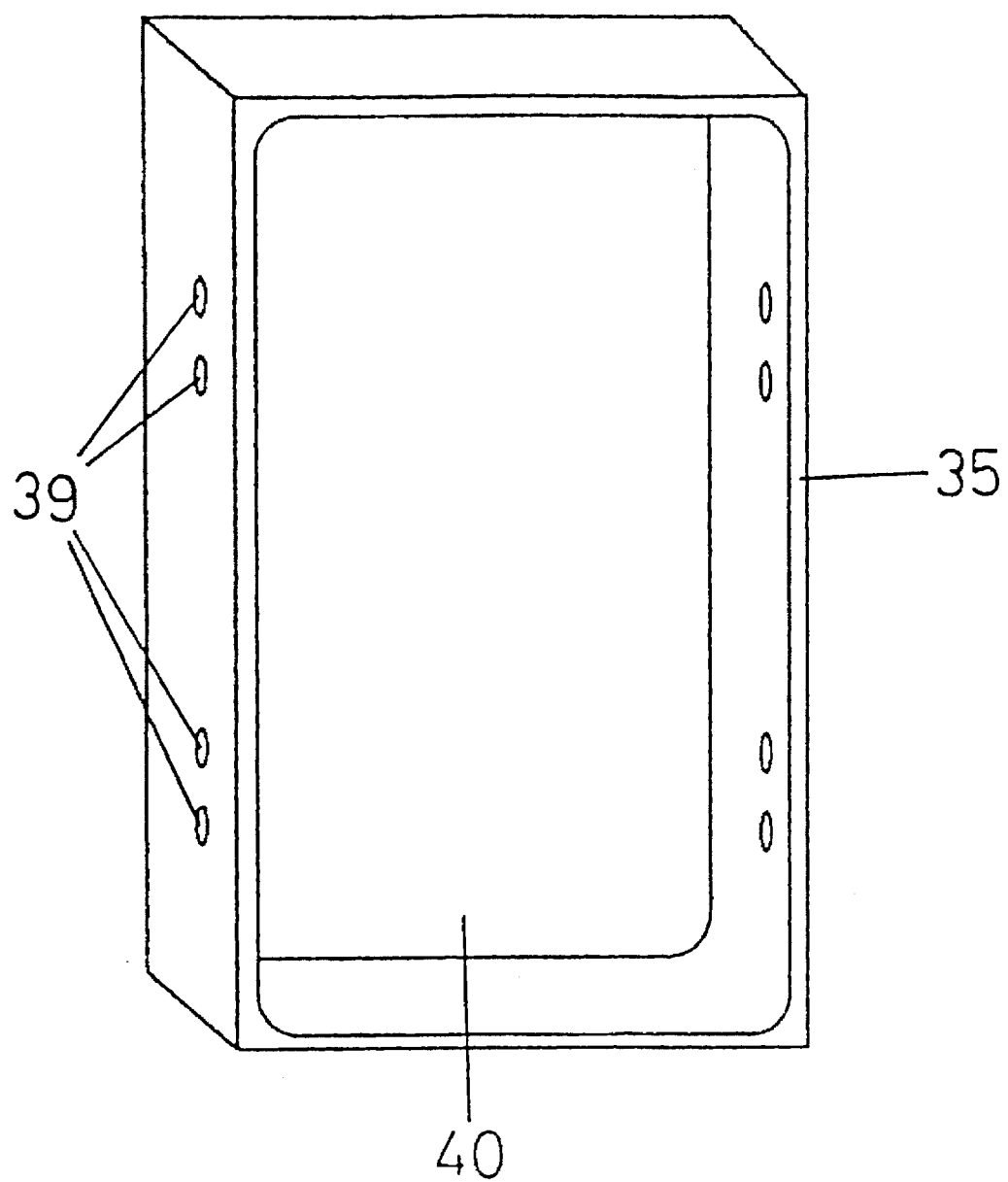
FIG. 4 shows a perspective view of an end plate according to the second embodiment in the present invention.
Figure 5:
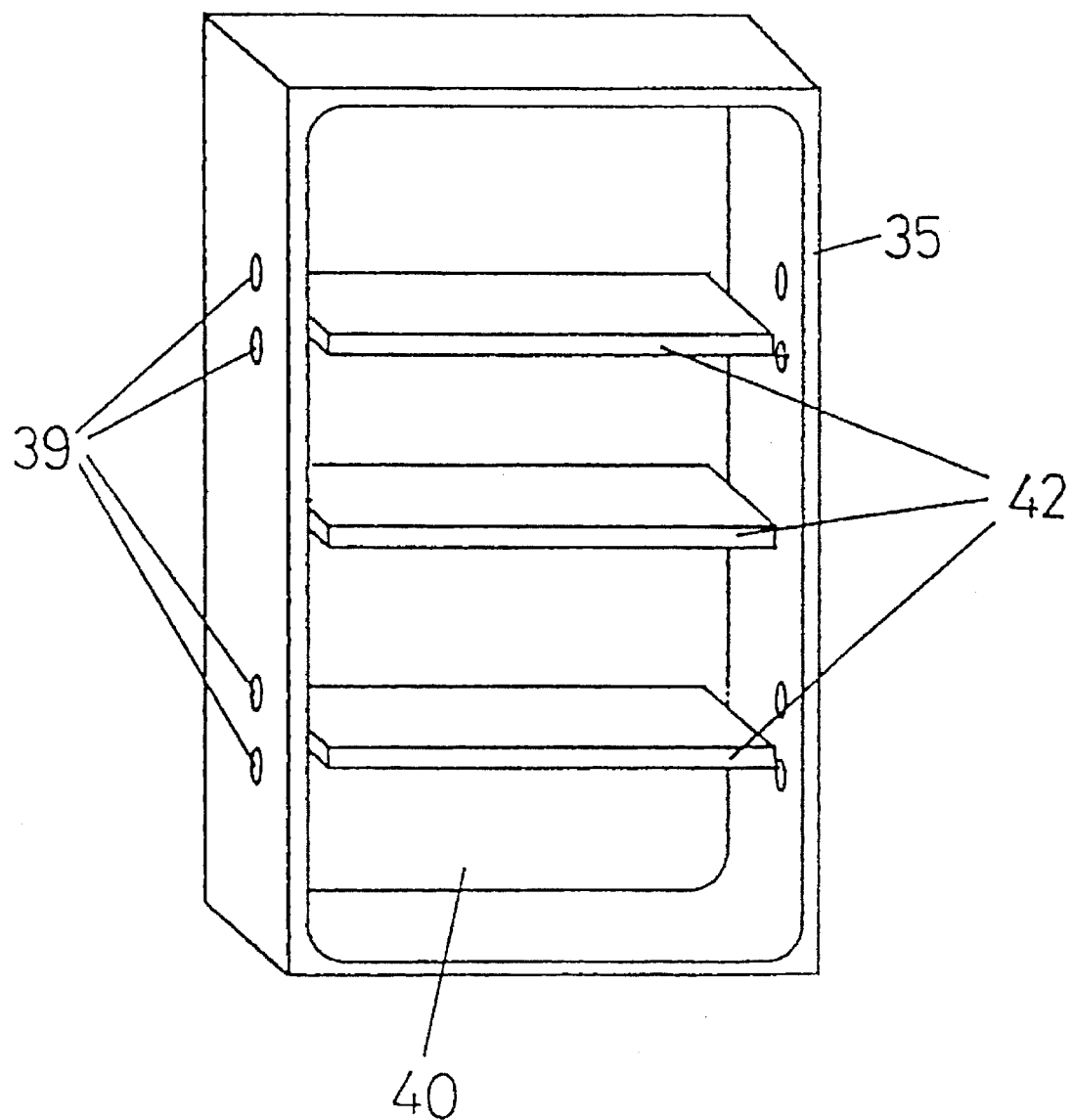
FIG. 5 is a perspective view of an end plate according to the third embodiment in the present invention.
Figure 6:
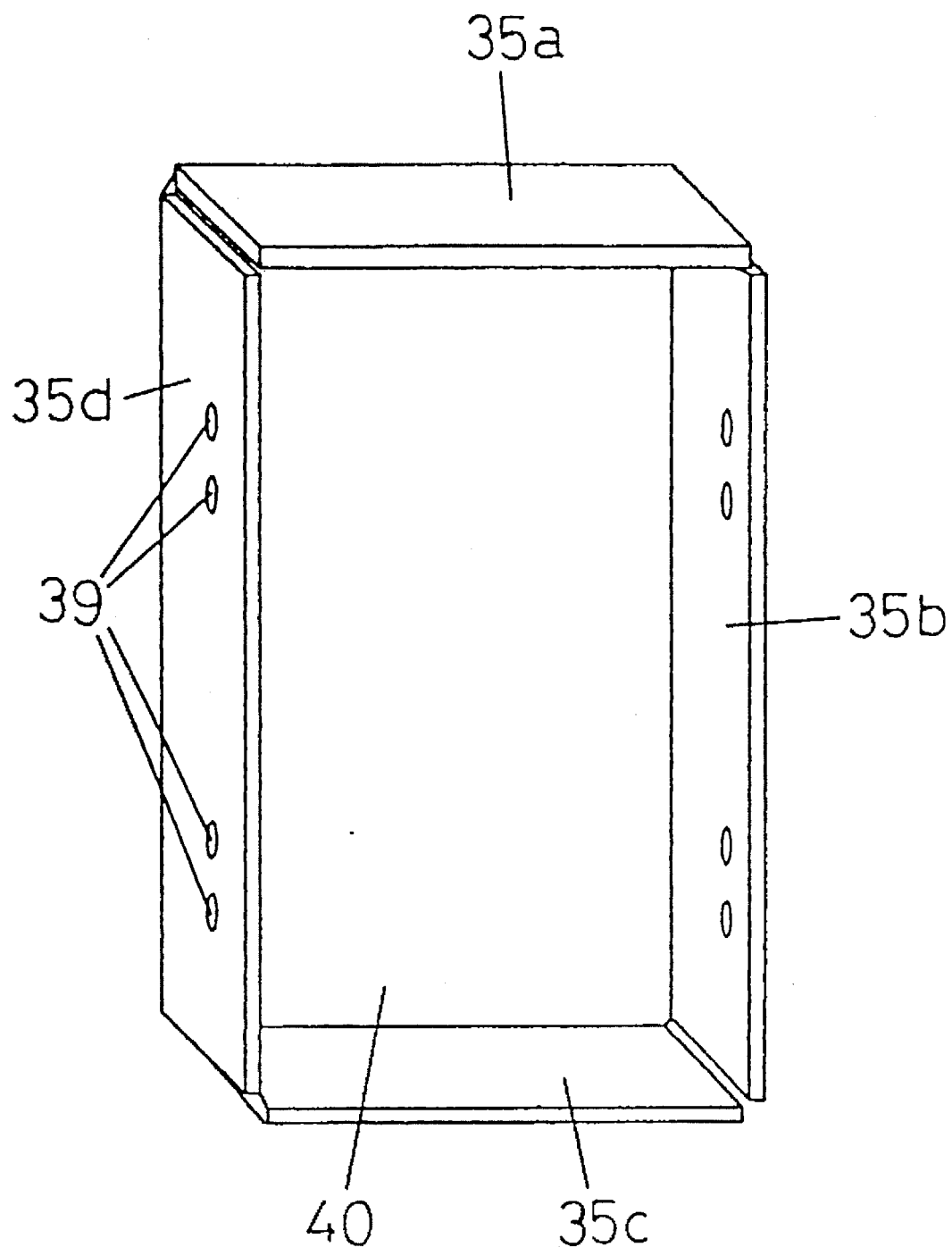
FIG. 6 is a perspective view of an end plate of the comparative example.
Figure 7:
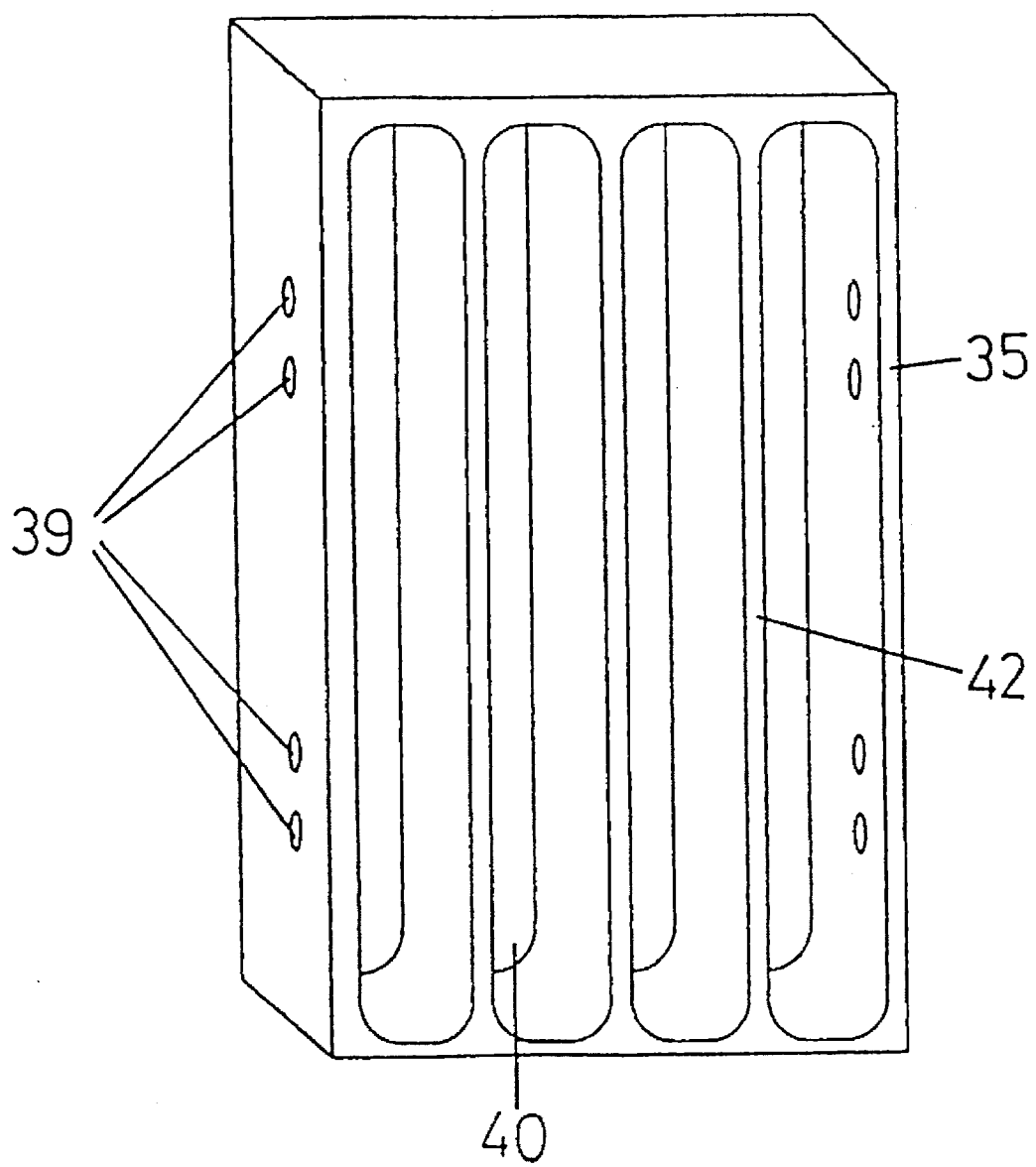
FIG. 7 is a perspective view of an end plate of another comparative example.
Figure 8:
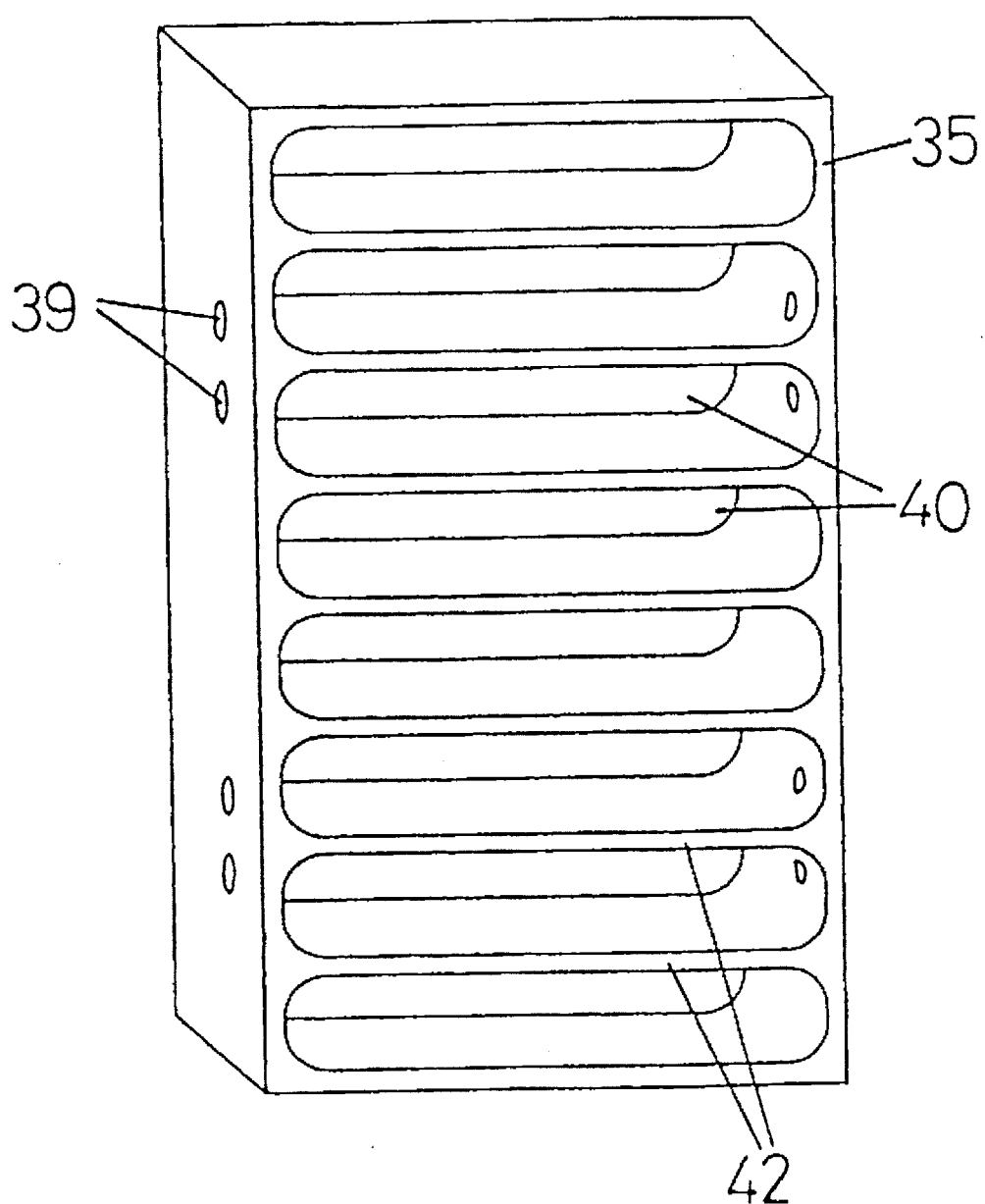
FIG. 8 is a perspective view of an end plate of the other comparative example.

In this embodiment, the structure of the end plate was examined. Module batteries using end plates shown in FIGS. 3, 4 and 5 are designated as module batteries Nos. 1, 2 and 3, respectively. Module batteries using end plates shown in FIGS. 6, 7 and 8 are designated as module batteries Nos. 4, 5 and 6 as a comparative embodiments, respectively. The respective end plates are made of aluminum.

The end plate shown in FIG. 4 has a structure in which the ribs 42 are removed from the end plate of FIG. 3. The end plate of FIG. 5 has a structure in which both ends of each rib 42 are not communicated with the frame portion 35, and that of FIG. 6 has a structure in which frame portions 35a, 35b, 35c and 35d rising from the four sides of the flat plate 40 are not mutually continuous. That of FIG. 7 is provided with vertically extending three ribs 42, and that of FIG. 8 is provided with horizontally extending seven ribs 42.

A discharge capacity test was conducted by charging each module battery for 12 hours at a current of 10 A, allowing the module battery to stand for 1 hours, and discharging it at a current of 20 A until the voltage of the module battery decreased to 4 V. The discharge capacity of the module battery was calculated by using a discharge time required to decrease the voltage to 5 V. Furthermore, the discharge capacity of a cell was calculated by using a discharge time required to decrease the cell voltage to 1 V. While charging, the spaces 36 between the cells 10 in the module battery 31 and the surfaces of the narrower side walls 19, and the end plate 33 were exposed to air supplied in the direction toward the bottom of the module battery 31 by a fan (not shown). The capacity of the fan was adjusted so that an average velocity of the air passing through the spaces 36 was 1.0 m/sec. The environmental temperature was 20° C.

A cycle life test was conducted by repeating the same conditions as the charging/discharging conditions for the discharge capacity test mentioned above. The initial dimension along the stacking direction in the module battery 31 was 200 mm. The results of the life test and the maximum deformation along the stacking direction in the module battery 31 are listed in Table 1.

TABLE 1

| battery No. | 1 | 2 | 3 | 4 | 5 | 6 |
|---|---|---|---|---|---|---|
| discharge capacity (Ah) | 98 | 96 | 97 | 83 | 98 | 98 |
| life (cycle) | 900 | 870 | 880 | 300 | 900 | 900 |
| maximum deformation (mm) | 1.9 | 2.3 | 2.0 | 4.8 | 1.9 | 1.9 |
| energy density (Wh/kg) | 65 | 65 | 65 | 58 | 60 | 60 |

As is obvious from Table 1, the module battery No. 4 is largely deformed and it is assumed that it has poor heat dissipation. Therefore, it has a short cycle life and low discharge capacity and energy density. The module batteries Nos. 5 and 6 had satisfactory discharge capacity and cycle life, but the energy density was degraded due to the increased weight. In contrast, the module batteries Nos. 1, 2 and 3 were suppressed to be deformed and had satisfactory discharge capacity, cycle life and energy density.

Accordingly, the rising portions in the rectangular frame portion are preferably continuous to one another. Furthermore, it is preferred to provide two or less vertically extending ribs, or five or less horizontally extending ribs.

[The Second Embodiment]

TABLE 2

| battery No. | 7 | 8 | 9 | 10 | 11 |
|---|---|---|---|---|---|
| discharge capacity (Ah) | 98 | 83 | 98 | 84 | 98 |
| life (cycle) | 900 | 300 | 900 | 350 | 900 |
| maximum deformation (mm) | 1.9 | 4.8 | 1.9 | 4.5 | 1.9 |
| energy density (Wh/kg) | 65 | 58 | 59 | 59 | 60 |

As is obvious from Table 2, the module battery No. 7 exhibits satisfactory performances in both tests, but the module batteries Nos. 8 and 10 are largely deformed owing to lack of strength and it is assumed that these have poor heat dissipation. The module batteries Nos. 9 and 11 have satisfactory discharge capacity, cycle life and deformation resistance, but the energy density is degraded due to the increase of the weight of the end plate 33.

Therefore, in using an end plate 33 of aluminum, it is preferred that the thickness of the flat plate portion 40 is 1 to 5 mm and the protrusion height of the rectangular frame portion 35 is 5 to 15 mm. This also goes for an aluminum alloy.

Similarly, in the case where end plates 33 made of steel or stainless steel was used, satisfactory performances were exhibited when the thickness of the flat The dimension of the end plate was examined. Module batteries were manufactured in the same configuration as in the First Embodiment. However, an aluminum end plate 33 having the same shape as that of the module battery No. 1, which exhibited excellent performances in the First Embodiment, was used. In this embodiment, the binding members 34 were all made of stainless steel.

A module battery in which the protrusion height of the rectangular frame portion 35 is 11 mm and the thickness of the flat plate portion 40 is 3 mm is designated as a module battery No. 7, ones using flat plates with thicknesses of 0.5 mm and 6 mm are designated as module batteries Nos. 8 and 9, respectively. Furthermore, one using an end plate having a flat plate portion 40 with a thickness of 3 mm and a frame portion 35 with protrusion height of 3 mm is designated as a module battery Nos. 10, and one using end plates 33 having a flat plate portion 40 with a thickness of 3 mm and a frame portion 35 with protrusion height of 17 mm is designated as a module battery 11. The evaluation results obtained through the same tests as in the First Embodiment are listed in Table 2. plate portion 40 was 0.5 to 3 mm and the protrusion height of the rectangular frame portion 35 was 5 to 15 mm.

[The Third Embodiment]

The material for the end plate was examined. Module batteries were manufactured in the same configuration as in the First Embodiment. However, an end plate 33 having the same shape as that of the module battery No. 1, which exhibited excellent performances the First Embodiment, that is, one having the flat plate 40 with a thickness of 3 mm and the rectangular frame portion 35 with a protrusion height of 11 mm, was used. A module battery using end plates 33 of aluminum having a tensile strength of 270 MPa is designated as a module battery No. 12. Furthermore, ones using end plates 33 of steel with a tensile strength of 300 MPa and end plates of stainless steel with a tensile strength of 250 MPa are designated as module batteries Nos. 13 and 14, respectively. Furthermore, one using end plates 33 of copper having a tensile strength of 200 MPa is designated as a module battery No. 15, and one using end plates 33 of polyethylene with a tensile strength of 28 MPa is designated as a module battery No. 16.

The evaluation results of the same tests as the First Embodiment are listed in Table 3.

TABLE 3

| battery No. | 12 | 13 | 14 | 15 | 16 |
| --- | --- | --- | --- | --- | --- |
| discharge capacity (Ah) | 98 | 98 | 95 | 98 | 83 |
| life (cycle) | 900 | 900 | 900 | 750 | 200 |
| maximum deformation (mm) | 1.9 | 1.9 | 1.9 | 2.3 | 5.2 |
| energy density (Wh/kg) | 65 | 63 | 63 | 59 | 57 |

The module batteries Nos. 12, 13 and 14 exhibit satisfactory performances, but with regard to the module batteries Nos. 13 and 14, although the strength is secured, the energy density is slightly degraded because the specific gravity is larger than that of aluminum. With regard to the module battery No. 15, the lifetime is slightly shortened because of lack of strength and the degradation of heat dissipation, and in addition, the energy density is decreased because of the large specific gravity. Furthermore, with regard to the module battery No. 16 using the polyethylene end plate 33, the strength is largely degraded, and additionally the lifetime is largely shortened because of poor heat conductivity and heat dissipation of the end plate 33.

Accordingly, an end plate is preferably made of a material which is light and has such a sufficient strength in a given size that deformation is not caused by the increase of the internal pressure, specifically a material having a tensile strength of 250 MPa or more, in particular, a material including aluminum having excellent heat conductivity as a main component.

Furthermore, similar results were obtained with regard to the material for the binding member.

[The Forth Embodiment]

In this embodiment, the dimension of the binding member 34 was examined. Stainless steel having a tensile strength of 250 MPa was used as the binding member 34 in this embodiment. One having the same configuration as that of the module battery No. 1 of the example and using a binding member 34 with a width of 30 mm and a thickness of 1 mm is designated as a module battery No. 17. Ones having the same configuration as that of the module battery No. 1 of the example and using binding members 34 with a width of 30 mm and thicknesses of 0.3 mm and 3 mm are designated as module batteries Nos. 18 and 19, respectively. Similarly, ones using binding members with a thickness of 1 mm and widths of 10 mm and 50 mm are designated as module batteries Nos. 20 and 21, respectively.

The evaluation results of the same tests as in the First Embodiment are listed in Table 4.

TABLE 4

| battery No. | 17 | 18 | 19 | 20 | 21 |
| --- | --- | --- | --- | --- | --- |
| discharge capacity (Ah) | 98 | 83 | 98 | 84 | 98 |
| life (cycle) | 900 | 300 | 900 | 350 | 900 |
| maximum deformation (mm) | 1.9 | 4.8 | 1.9 | 4.5 | 1.9 |
| energy density (Wh/kg) | 65 | 58 | 59 | 60 | 60 |

As is obvious from Table 4, the module batteries Nos. 18 and 20 are largely deformed because of lack of strength and have poor heat dissipation. Furthermore, the module batteries Nos. 19 and 21 have superior discharge capacity, cycle life and maximum deformation, but the energy density was degraded because of the increased weight. The module battery No. 17 exhibited the most satisfactory performances.

Therefore, it is preferred that the binding member has a thickness of 0.5 to 2 mm and a width of 20 to 40 mm.

EXAMPLE 5

Ten module batteries were experimentally manufactured, in each of which the configuration was the same as that of the module battery No. 1 that exhibited excellent performances in the First Embodiment but the binding members 34 were not located at the predetermined positions on the battery casing 12 because no recess was formed on the cells 10 and the outer surfaces of the casing 12, and were subjected to a vibration test. The module battery 31 was vertically excited for 6 hours under the excitation conditions of a maximum acceleration of 48 m/s$^2$ and a frequency of 33 Hz, and change in the appearance of the module battery 31 was observed.

As a result, although no change was observed in the appearance of the module battery No. 1, two binding members 34 shifted their positions against the group of cells in the module batteries 31 where the binding members 34 were not located at the predetermined positions on the battery casings 12. Taking the usage in a vibrating state as a mobile power supply into consideration, the binding members are preferably fitted in the recesses on the outer surfaces of the battery casing.

[The Sixth Embodiment]

Ten module batteries were experimentally manufactured, in each of which the cells and the binding members 34 were fixed on the frame portion 35 of the end plate 33 through resistance welding, and were subjected to the vibration test under the same conditions as in the Fifth Embodiment.

As a result, no change was observed in the appearance of the module battery according to the invention, but in one of the ten module batteries in which the binding members were resistance welded to the frame of the end plate, the weld portion was ruptured. This is because the strength of the welding is smaller than the strength obtained by fixing with the studs. As means for improving the welding strength, a method in which the power of a welder is increased and an area to be welded is enlarged is generally adopted, but the temperature is largely increased due to the heat generated by the welding and there arises a problem that a battery casing of a synthetic resin is melted. Furthermore, when screwing with bolt and nut or the like is adopted in stead, the head of the bolt protrudes from the frame of the end plate, resulting in degrading the volume energy density. Therefore, the binding member is fixed on the frame of the end plate preferably by means of a metal stud or screw.

Furthermore, since the module battery of the invention is used in the open air for a long period as a mobile power supply and there is a possibility of leakage of the alkaline electrolyte in emergency usage, it is preferred that the surfaces of the metal end plate and binding member are subjected to a corrosion inhibition treatment and are coated with a resin coating film having alkali resistance and electric insulating property for avoiding external short-circuit.

Furthermore, the working pressure of the safety valve is preferably set at 0.2 MPa, that is, the maximum value of the internal pressure in the normal usage of the module battery of the example, or more, and 0.8 MPa, that is, the pressure limit of the battery casing and the binding member, or less.

According to the invention, by disposing an end plate including a flat plate portion and a rectangular frame portion at each end of a cell group and by binding the cell group by means of binding members and metal studs, the increase of the internal pressure during the charging/discharging cycles and the dimensional change of a module battery due to the expansion of the cell group can be suppressed, while the weight and volume increase caused by the binding members is minimized. As a result, since heat generated within the battery can be efficiently dissipated out of the battery, the discharge capacity of the module battery can be prevented from decreasing and the cycle life can be improved.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A module battery of a sealed alkaline storage battery comprising:
   a cell group including a plurality of cells stacked in the same direction as a lamination direction of electrodes thereof, the power generation elements of the cells being contained in a rectangular battery casing formed of a synthetic resin sealed with a lid having a safety valve;
   an end plate disposed at each end surface in the stacking direction of said cell group; and
   band-like binding members for coupling said end plates to each other and binding said cell group in the stacking direction,
   wherein each end plate includes a rectangular flat plate portion and a rectangular frame portion extending outwardly from four side edges of said flat plate portion in a continuous manner, said binding members being connected to said rectangular frame portion of each of said end plates.

2. The module battery of a sealed alkaline storage battery in accordance with claim 1,
   wherein each end plate is made of steel or stainless steel, said rectangular flat plate portions have a thickness of 0.5 to 3 mm and said rectangular frame portions have a height of 5 to 15 mm.

3. The module battery of a sealed alkaline storage battery in accordance with claim 1,
   wherein said end plates are made of aluminum or an aluminum alloy, said rectangular flat plate portions have a thickness of 1 to 5 mm and said rectangular frame portions have a height of 5 to 15 mm.

4. The module battery of a sealed alkaline storage battery in accordance with claim 1,
   wherein each end plate has two or less reinforcing ribs extending in the vertical direction to the battery and five or less reinforcing ribs extending in the horizontal direction to the battery.

5. The module battery of a sealed alkaline storage battery in accordance with claim 1,
   wherein each of said binding members has a thickness of 0.5 to 2 mm and a width of 20 to 40 mm.

6. The module battery of a sealed alkaline storage battery in accordance with claim 1,
   wherein each of said binding members is fixed on said rectangular frame portions of said end plates at both ends thereof with studs or screws made of a metal.

7. The module battery of a sealed alkaline storage battery in accordance with claim 1,
   wherein said rectangular end plates and said binding members are made of a material selected from the group consisting of aluminum, an aluminum alloy, steel and stainless steel, and have a tensile strength of 250 MPa or more.

8. The module battery of a sealed alkaline storage battery in accordance with claim 1,
   wherein said end plates and said binding members are coated with a resin coating film having alkali resistance and electric insulating property.

9. The module battery of a sealed alkaline storage battery in accordance with claim 1,
   wherein said safety valves provided on said lids have a working pressure of 0.2 to 0.8 Mpa.

10. The module battery of a sealed alkaline storage battery in accordance with claim 1,
    wherein said battery casing has recesses on outer surfaces thereof for fitting part of or the entire of said binding members.

* * * * *